United States Patent
Golner et al.

(10) Patent No.: US 9,343,222 B2
(45) Date of Patent: May 17, 2016

(54) INSULATION FOR POWER TRANSFORMERS

(71) Applicant: Waukesha Electric Systems, Incorporated, Waukesha, WI (US)

(72) Inventors: Thomas M. Golner, Pewaukee, WI (US); Shirish P. Mehta, Waukesha, WI (US); Jeffery J. Nemec, Oconomowoc, WI (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 89 days.

(21) Appl. No.: 14/056,656

(22) Filed: Oct. 17, 2013

(65) Prior Publication Data
US 2015/0109087 A1  Apr. 23, 2015

(51) Int. Cl.
*H01F 27/00* (2006.01)
*H01F 27/32* (2006.01)
*H01F 41/12* (2006.01)
*H01F 27/02* (2006.01)

(52) U.S. Cl.
CPC .............. *H01F 27/323* (2013.01); *H01F 27/00* (2013.01); *H01F 27/02* (2013.01); *H01F 27/324* (2013.01); *H01F 41/125* (2013.01); *Y10T 428/249921* (2015.04)

(58) Field of Classification Search
CPC ............................................ H01F 27/00–27/35
USPC ...................... 336/196, 198, 206–208, 55–32
See application file for complete search history.

(56) References Cited

U.S. PATENT DOCUMENTS

| | | | | |
|---|---|---|---|---|
| 3,086,184 | A * | 4/1963 | Nichols | ................. H01F 27/322 336/192 |
| 4,095,205 | A * | 6/1978 | Schroeder | ............. H01F 27/324 174/110 PM |
| 7,201,572 | B2 * | 4/2007 | Wood | .................... C04B 35/565 264/109 |
| 2012/0156956 | A1 * | 6/2012 | Turpin | ..................... B32B 5/26 442/334 |

* cited by examiner

*Primary Examiner* — Tuyen Nguyen
(74) *Attorney, Agent, or Firm* — Baker & Hostetler LLP

(57) ABSTRACT

A power transformer is provided that includes a first transformer component, a second transformer component; and an electrical insulator. The electrical insulator is disposed between the first transformer component and the second transformer component. The electrical insulator includes a first layer and a second layer. The first layer has a binder fiber. The binder fiber is a staple fiber coated with a binder material. The second layer has an uncoated staple fiber. The first layer and the second layer are bound together with the binder material.

20 Claims, 3 Drawing Sheets

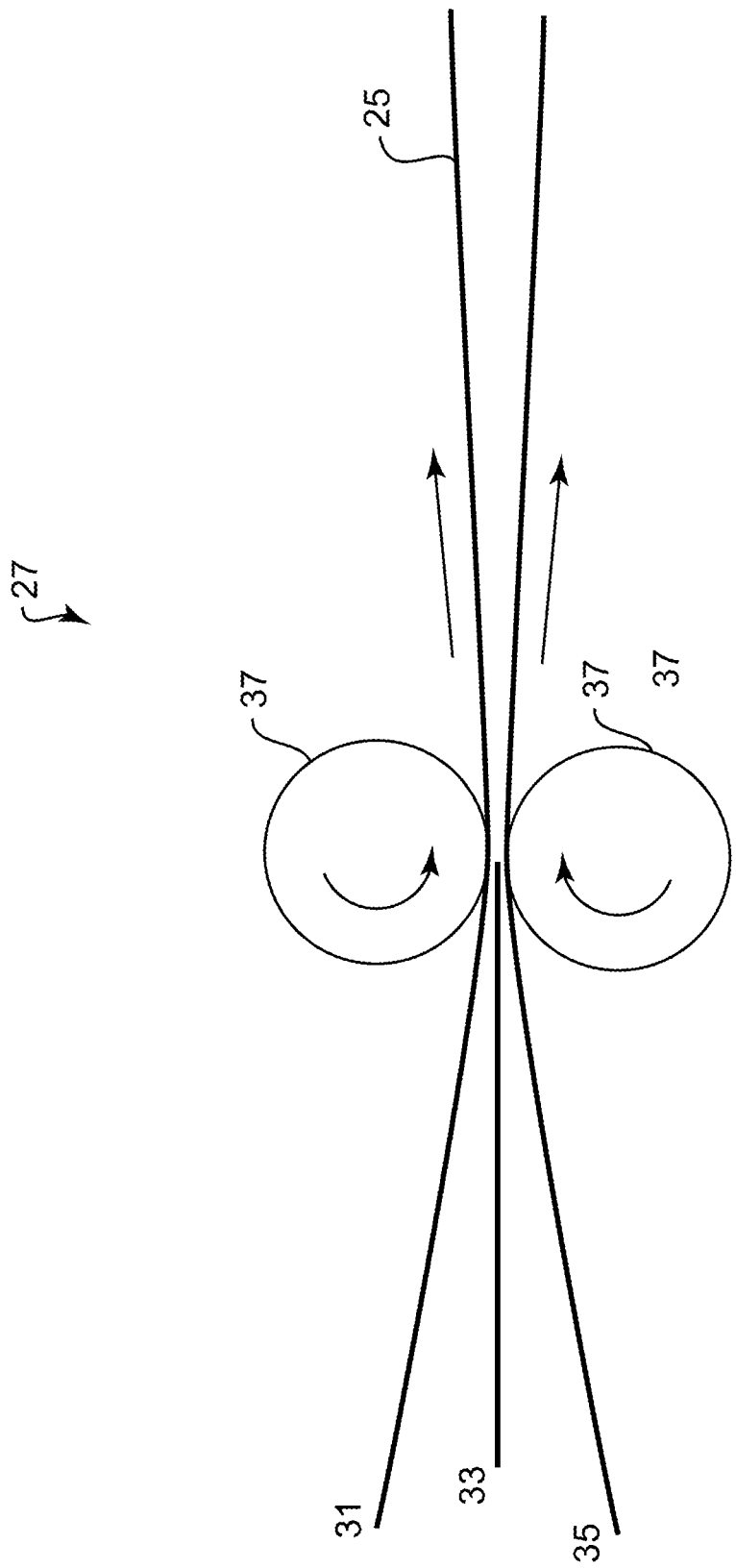

INSULATION FOR POWER TRANSFORMERS

FIELD OF THE INVENTION

The invention relates generally to insulation. More particularly, the invention relates to insulation for power transformers.

BACKGROUND OF THE INVENTION

Currently available high-voltage, fluid-filled power transformers utilize cellulose-based insulation materials that are impregnated with dielectric fluids. More specifically, such insulation systems include cellulose-based materials that are positioned between turns, between discs and sections, between layers, between windings and between components at high voltage and ground potential parts (e.g., cores, structural members and tanks).

In order to operate, currently available transformers typically include insulation materials that have a moisture content of less than 0.5% by weight. However, since cellulose naturally absorbs between 3 and 6 weight percent of moisture, a relatively costly process of heating under vacuum is typically performed before cellulose is suitable for use in a power transformer. Even pursuant to such a heating/vacuum process, as the cellulose ages (i.e., degrades over time), moisture eventually forms, as does acid, which accelerates the aging process.

Since the rate at which cellulose ages is dependent upon temperature, normal operating temperatures of currently available power transformers is 105° C. or less. For the same reason, the maximum operating temperature of such transformers is 120° C. or less. As more power is transferred, the higher losses due to higher current generate higher temperatures. As such, cellulose-based insulation systems limit the operational efficiency of power transformers.

SUMMARY

Aspects of the invention advantageously provide insulation for power transformers.

In an aspect, a power transformer includes a first transformer component, a second transformer component; and an electrical insulator. The electrical insulator is disposed between the first transformer component and the second transformer component. The electrical insulator includes a first layer and a second layer. The first layer has a binder fiber. The binder fiber is a staple fiber coated with a binder material. The second layer has an uncoated staple fiber. The first layer and the second layer are bound together with the binder material.

In another aspect, an insulating material for a power transformer includes a first layer and a second layer. The first layer has a binder fiber. The binder fiber is a staple fiber coated with a binder material. The second layer has an uncoated staple fiber. The first layer and the second layer are bound together with the binder material.

In a further aspect, an electrical insulator for a power transformer is made by carding and calendering a binder fiber to generate a first layer. The binder fiber is a staple fiber coated with a binder material. In addition, an uncoated staple fiber is carded and calendered to generate a second layer. The first layer and the second layer are calendered together to generate the electrical insulator.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

FIG. 2 is a side view of a simplified calendering device suitable for fabricating the electrical insulation according to an aspect that may be used as part of an insulation system for the transformer illustrated in FIG. 1.

DETAILED DESCRIPTION

In general, various aspects of the invention provide an improved electrical insulation, method of making the improved electrical insulation, and electrical system utilizing the improved electrical insulation. The improved electrical insulation generally includes two or more layers calendered together. For the purpose of this disclosure, the term, "calendered" is defined as any suitable method of laminating or otherwise binding layers together. In general, examples of suitable calendering methods include heat, pressure, and/or the like. In an aspect, the layers may include different properties such as strength, electrical resistance, impermeability, and the like. It is an advantage of one or more aspects of the invention that the electrical insulator resulting from this combination has improved properties such as, for example improved thermal stability; increased dimensional stability; improved flame retardant properties; increased modulus and tensile strengths; improved barrier properties against moisture, solvents, chemical vapors, and the like; lower density; and the like.

Figure 1:
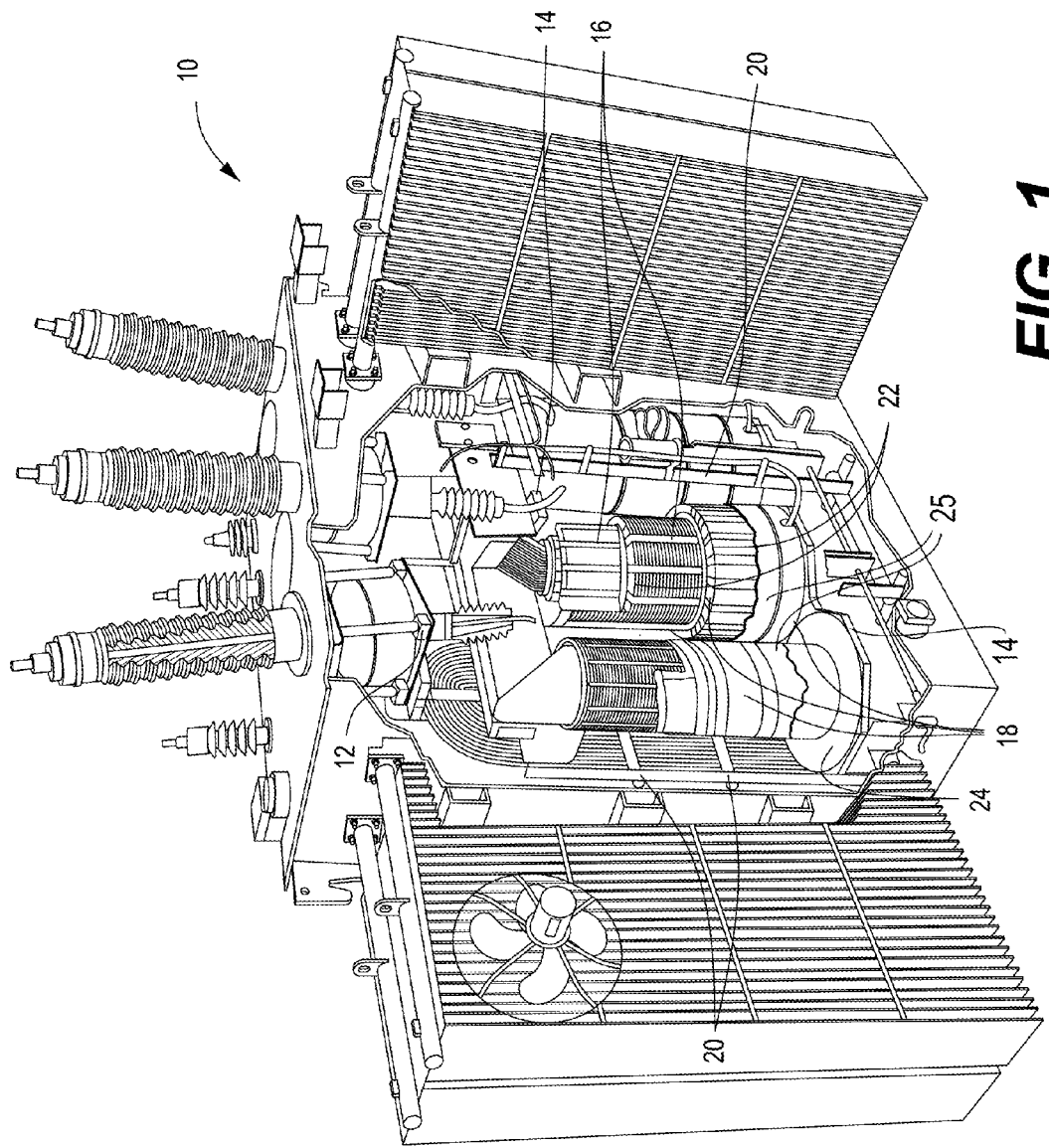
FIG. 1 is a perspective view of a cross-section of a high-voltage, fluid-filled power transformer suitable for use with an electrical insulation according to an aspect.

Aspects of the invention will now be described with reference to the drawing figures, in which like reference numerals refer to like parts throughout. FIG. 1 is a perspective view of a cross-section of a high-voltage, fluid-filled power transformer 10 according to an aspect of the invention. As illustrated in FIG. 1, the power transformer 10 includes a variety of transformer components that all may have insulation positioned between and/or around them. More specifically, the power transformer 10 includes components such as current transformer (CT) supports 12, support blocks 14, locking strips 16, winding cylinders 18, lead supports 20, radical spacers 22 and end blocks 24. Some or all of the various components may be wrapped or otherwise covered with an electrical insulation 25. More particularly, the electrical insulation 25 is disposed between the various components of the power transformer 10 to prevent or reduce current arcing between the components. While, in practice, some or all components of the power transformer 10 may be wrapped in the electrical insulation 25 and that wires and plates within the components may also be wrapped in the electrical insulation 25, for purposes of clarity, all of the various instances of the electrical insulation 25 are not illustrated in FIG. 1.

In operation, a cooling fluid flows between the transformer components 12, 14, 16, 18, 20, 22, 24 and is in contact with the electrical insulation 25, typically with at least some flow therethrough as well. The cooling fluid may include any suitable fluid for cooling electrical components. Examples of suitable cooling fluids include oils, paraffin, esters, cryogenic fluids, and the like. Particular examples of suitable fluid include an electrical or dielectric insulating fluid such as, for example, a napthenic mineral oil, a paraffinic-based mineral oil including isoparaffins, synthetic esters and natural esters (e.g., FR3™)). For purposes of clarity, the cooling fluid is not illustrated in FIG. 1. The cooling fluid is selected not only to cool components within the power transformer 10 during the operation thereof but also to physically withstand the conditions (e.g., temperature levels, voltage and current levels, etc.) found within the power transformer 10 during the operation thereof Further, the cooling fluid is selected to be chemically inert with respect to the transformer components and with respect to the electrical insulation 25 that is positioned between these components.

In addition, cryogenic fluids such as liquid nitrogen and liquid helium may be utilized as the cooling fluid. For example, the power transformer 10 may be a superconducting power transformer or associated with a superconducting device. In such instances, the power transformer 10 may include cryogenic cooling fluids.

FIG. 2 is a side view of a simplified calendering device 27 suitable for fabricating the electrical insulation 25 according to an aspect that may be used as part of an insulation system for the power transformer 10 illustrated in FIG. 1. As shown in FIG. 2, the calendering device 27 is configured to laminate or otherwise bind a plurality of layers 31, 33, and 35 together to form the electrical insulation 25. Each of the layers 31, 33, 35 may be the same or different from others of the layers 31, 33, 35. In a particular example, the layer 33 may predominantly or entirely composed of stable fibers selected to provide strength to the electrical insulation 25. For example, the layer 33 may be 95-100% (w/w) staple fibers and 0-5% (w/w) binder fibers. In this or other examples, one or both of the layers 31 and 35 may include sufficient binder to adhere the layers 31, 33, 35 together during the calendering operation. For example, the layers 31 and 35 may be about 30-80% (w/w) binder fibers and 70-20% (w/w) staple fibers. In various examples, the staple fibers and binder may include any suitable materials and/or finishes. In a particular example, staple fibers for one or more of the layers 31, 33, and 35 includes a polyethylene terephthalate (PET) or other similar staple fiber. To generate each of the layers 31, 33, 35, the fibers (staple and/or binder fibers) may be carded and calendared into what is the equivalent of a synthetic paper. The binder may include a polybutylene terephthalate (PBT) or other such thermoplastic. In a particular example, the layers 31 and 35 may be a blend of staple fibers and a plurality of binder fibers 30, shown in FIG. 3, where the binder fibers 30 include a staple fiber 32 that may include PET and a coating 34 that may include PBT.

To calender the layers 31, 33, and 35, the calendering device 27 includes calender rolls 37 that are configured to press the layers 31, 33, and 35 together and urge the resultant electrical insulation 25 forward. To bind the layers 31, 33, 35 together, the calender rolls 37 may be heated and/or heat may otherwise be applied to the layers 31, 33, 35 at or near the calender rolls 37. In general, the density of the electrical insulation 25 may be increased by increasing the pressure exerted by the calender rolls 37 on the layers 31, 33, 35 and/or the temperature of the calender rolls 37. It is a benefit of some aspects that the density of the electrical insulation 25 described herein may be about 0.50 to about 1.20 grams/cubic centimeter (g/cc). The heat imparted upon the layers 31, 33, 35 depends upon a variety of factors such as, for example: melting temperature of the binder; thickness of the layers 31, 33, 35; speed of the layers 31, 33, 35 travelling through the calendering device 27; empirical data; and the like.

Additionally, it should be noted that the invention further contemplates calendaring two of the three layers 31, 33, 35 in a first process to form a first two layer construction. Subsequently, the remaining one of the three layers 31, 33, 35 may be calendared with the first two layer construction to thereafter result in the insulation 25 that includes all three layers 31, 33, 35. This two-step process may be utilized in order to make manufacturing easier and less costly.

In a particular example in which PBT is the binder, the temperature of the calender rolls may be about 223° C. to about 250° C. The following is a table of properties for various formulations of the electrical insulation 25:

TABLE I

| Property | PBT/PET Paper | PET Paper | PBT/PET + PET Duplex | PBT/PET + PET + PET/PBT |
|---|---|---|---|---|
| Weight (g/m²) | 59.6 | 57.1 | 117 | 141 |
| Thickness (um) | 82.4 | 80 | 136 | 141 |
| MD Tensile (N/m) | 2234 | 2910 | 6678 | 10880 |
| Density (g/cm³) | 0.72 | 0.71 | 0.86 | 1.00 |
| XMD Tensile (N/m) | 690 | 794 | 1953 | |
| MD Elongation (%) | 12.0 | 8.9 | 12.5 | 7.8 |
| XMD Elongation (%) | 4.2 | 4.1 | 2.6 | |
| Dielectric Str (kV/mm) | 30 | 24 | 40 | 45 |
| Air Perm. (scfm) | 3.8 | 4.0 | .67 | .19 |

As is demonstrated in the Table I above, the electrical insulation 25 having the PBT/PET+PET+PET/PBT combination exhibits much superior properties and exceeds the properties of adding the individual layers together. For example, in the machine direction (MD) the tensile strength of the triple ply paper (PBT/PET+PET+PET/PBT) is about 32% stronger than the individual sheets that make it up and the triple ply paper is thinner than the three sheets. In general, the thickness of the layers 31, 33, 35 may be thinner or thicker than that listed in Table I and the thickness of each layer 31, 33, 35 may be varied independently. In this or other aspects, the properties of adjacent layers may be selected to generate an unequal stress at the interface between the layers 31, 33, 35. This stress or pre-tensioning may improve the working properties of the electrical insulation 25 beyond an additive effect of the layers 31, 33, 35 used to generate the electrical insulation 25.

To generate this pre-tensioning, the outer layers may contain 30-80% (w/w) of the binder fibers 30 with the rest of the fibers being a PET staple fiber. This combination of fibers is blended, carded and calendared. Once the layers 31 and 35 are calendared, the multiple layers 31, 33, 35 are run through an additional calendaring process. Once bonded at a high temperature, the three layer paper is stable at the operating temperatures in the dielectric fluid. Other suitable types of fiber combinations include one or more of the following staple fiber materials: polyphenylene sulphide (PPS); polyetherimide (PEI); polyethylene naphthalate (PEN); and polyethersulfone (PES) in combination with one or more of the following binder materials: copolymer of polyethylene terephthalate (CoPET); amorphous PET; polybutylene terephthalate (PBT); and undrawn polyphenylene sulphide (PPS).

By having two or more distinct layers, the mechanical and dielectric properties of the electrical insulation 25 are improved over a single layer paper of similar thickness and the outer layers may be used to bond to additional insulation or to a metallic conductor material disposed within the power transformer 10. In the following FIGS. 3-5, example is made of several conformations for the binder fiber 30. However, in addition to the binder fibers 30 shown, staple fibers such as uncoated PET fibers may be utilized alone or in combination with the binder fibers 30 to form a staple layer. As shown in FIG. 2, the layer 33 may be considered a staple layer which is formed into a core layer of the electrical insulation 25.

It should be further noted that the insulation 25 that includes the three layers 31, 33, 35 that are calendared may still maintain a certain degree of porosity of the fiber structure. Accordingly, the porous insulation 25 can still allow cooling fluid to flow therethrough.

Figure 3:
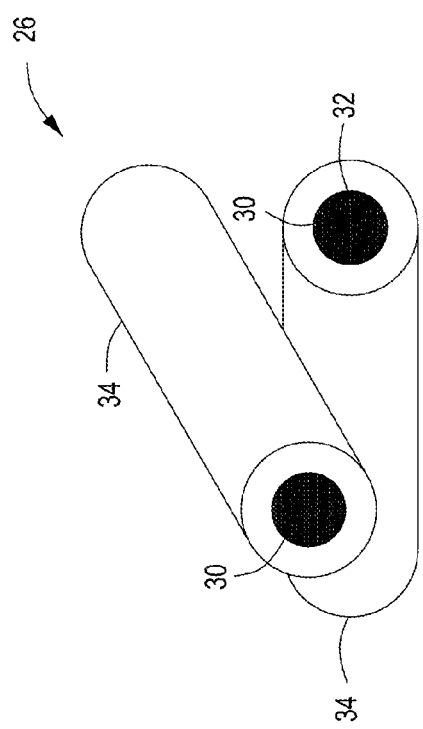
FIG. 3 is a perspective view of a composite structure according to an aspect that may be suitable for use with the electrical insulation of FIG. 2.

FIG. 3 is a perspective view of a composite structure 26 according to an aspect that may be suitable for use with the electrical insulation 25 of FIG. 2. The composite structure 26 includes many binder fibers 30, each of which includes at least one core or staple fiber 32. In some aspects, the staple layer such as the layer 33 shown in FIG. 2 may be made of predominantly or entirely of uncoated staple fibers 32. For convenience, two binder fibers 30-1 and 30-2 are depicted in FIG. 3, each having a single core, i.e., staple fiber 32-1 and staple fiber 32-2. In one aspect, all of the binder fibers 30 include a coating 34 of binder material adhered to, extruded over, etc., their respective staple fibers 32. As depicted in FIG. 3, the coatings 34-1 and 34-2 are bound to each other, which bind the binder fibers 30-1 and 30-2 together. In another aspect, at least some staple fibers do not include a coating 34 (not depicted for clarity), and are bound to those proximate binder fibers 30 that include a coating 34.

In various aspects of the invention, the staple fibers 32 and/or the coatings 34 optionally include a suitable nanoclay. If included, particular examples of suitable nanoclays may be available at Sigma-Aldrich (St. Louis, Mo.). A specific example of a suitable nanoclay includes montmorillonite having about a 1 nm thick aluminosilicate layers surface-substituted with metal cations and stacked in about 10 µm-sized multilayer stacks. Depending on surface modification of the clay layers, montmorillonite may be dispersed in a polymer matrix to form polymer-clay nanocomposite. Within the nanocomposite individual nm-thick clay layers may be fully separated to form plate-like nanoparticles with very high (nm×µm) aspect ratio (e.g., 1:100, and the like).

Although smaller and larger dimensions are also within the scope of the invention, the diameter of binder fiber 30 is typically on the order of microns and the length of each binder fiber 30 is typically on the order of millimeters or centimeters. As such, thousands or even millions of such binder fibers 30 are bound together to form the above-mentioned insulation system. The insulation system, once formed, is then positioned between the various components of the power transformer 10 illustrated in FIG. 1. Since the coating binder material does not form a continuous matrix, the above-mentioned cooling fluid is capable of impregnating and, at least to some extent, of flowing through the composite structure 26.

Figure 4:
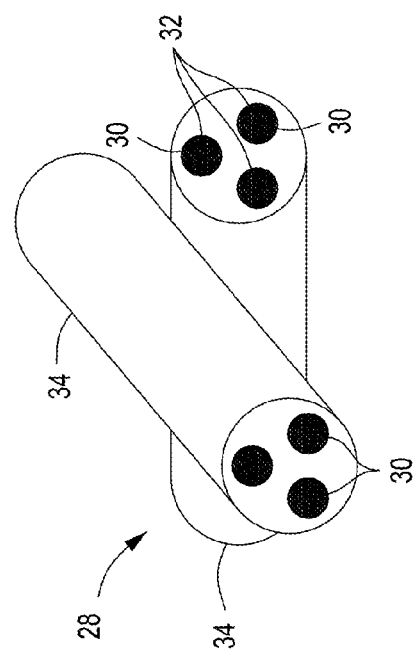
FIG. 4 is a perspective view of a composite structure according to another aspect that may be suitable for use with the electrical insulation of FIG. 2.

FIG. 4 is a perspective view of a composite structure 28 according to another aspect that may be suitable for use with the electrical insulation 25 of FIG. 2. In the composite structure 28, binder fibers 30 include several staple fibers 32, such as, for example, two, three, four, etc., and coating 34 adheres to, is extruded over, etc., all of the staple fibers 32 of each binder fiber 30. For convenience, two binder fibers 30-1 and 30-2 are depicted in FIG. 4, each having three staple fibers, i.e., staple fibers 32-1 and staple fibers 32-2. In one aspect, all of the binder fibers 30 include a coating 34, as illustrated in FIG. 4. The coatings 34 are bound to each other, which bind the binder fibers 30-1 and 30-2 together. In another aspect, at least some of the staple fibers (such as uncoated PET fibers) do not include a coating 34 (not depicted for clarity), and are bound to those proximate binder fibers 30 that include a coating 34. Advantageously, the composite structure 26 is simple to fabricate, while the composite structure 28 has greater mechanical strength.

Figure 5:
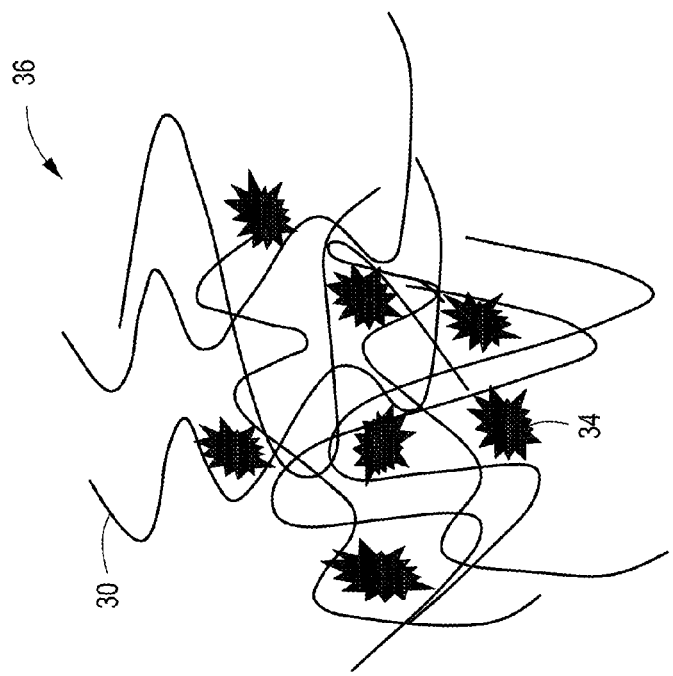
FIG. 5 is a perspective view of a composite structure according to yet another aspect that may be suitable for use with the electrical insulation of FIG. 2.

FIG. 5 is a perspective view of a composite structure according to yet another aspect that may be suitable for use with the electrical insulation of FIG. 2. In this aspect, the coating 34 is in the form of a plurality of particles of solid binding material that are adhered to at least two staple fibers 32. Composite structure 36 advantageously has a high porosity. In addition, the composite structure 36 advantageously has a relatively high strength and may be considered a staple layer such as the layer 33 shown in FIG. 2. Of note, while the staple fibers 32 are shown in a relatively random arrangement, in other examples some or all of the staple fibers 32 may be arranged or oriented to provide additional strength along the lines of orientation.

In general, staple fibers 32 can be made from a suitable material. In some aspects, the staple fibers 32 include a relatively high-melting-point thermoplastic material, while in other aspects, the staple fibers 32 include a staple fiber material, such as, for example, natural materials such as, for example, raw cotton, wool, hemp, or flax. For example, materials contemplated by the invention include one or more of polyethylene terephthalate (PET), polyphenylene sulphide (PPS), polyetherimide (PEI), polyethylene naphthalate (PEN) and polyethersulfone (PES). According to certain aspects of the invention, staple fibers 32 are made from materials/composites/alloys that are mechanically and chemically stable at the maximum operating temperature of the power transformer 10. Also, the staple fibers 32 can be made from materials/composites/alloys that are mechanically and chemically stable at the melting temperature of the coatings 34.

The staple fibers 32 can be formed from the same material, or, alternatively, some of the staple fibers 32 can be formed from one or more different materials. For example, referring to FIGS. 3 and 4, the staple fiber 32-1 can be made from a different material than the staple fiber 32-2.

Similarly, coatings 34 can be made from a suitable material. In certain aspects, coatings 34 include at least one of an amorphous and a crystalline thermoplastic material that is mechanically and chemically stable when in contact with the above-mentioned cooling fluid. In one aspect, coatings 34 include at least one of a copolymer of polyethylene terephthalate (CoPET), amorphous PET, polybutylene terephthalate (PBT) and undrawn polyphenylene sulphide (PPS).

While no particular restrictions are generally placed upon the relative weight or volume percentages of binder fibers 30 to coatings 34, in certain aspects of the invention, the weight ratio of binder fibers 30 to coatings 34 is between approximately 8:1 and approximately 1:1. Also, although other densities are also contemplated by the invention, composite structures 26, 28, 36 have densities of between approximately 0.5 g/cm$^3$ and approximately 1.20 g/cm$^3$. Further, according to certain aspects of the invention, the material(s) for the binder fibers 30 and the coatings 34 are selected to have dielectric characteristics that are substantially similar to those of the cooling fluid used in the power transformer 10.

As mentioned above, nanoclay particles may be added to staple fibers 32 and/or coatings 34, such as, for example, silicates such as montmorillonite, bentonite, kaolinite, hectorite, halloysite, and the like in the size range of about 1 nm to about 10,000 nm. More particularly, the nanoclay may include plate-like particles having a size of about 1 nm to about 100 nm in height and a length and width of about 10 to 100 times the height. In many aspects, the binder fibers 30 may include any suitable amount of the nanoclay. Examples of suitable amounts includes about 0.1% weight/weight (w/w) to about 60% w/w. In one example, the nanoclay may be about 0.5 to 7% w/w of the binder fibers 30.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A power transformer, comprising:
   a first transformer component;
   a second transformer component; and
   an electrical insulator disposed between the first transformer component and the second transformer component, the electrical insulator including:
   a first layer having a binder fiber, the binder fiber being a staple fiber coated with a binder material;
   a second layer having an uncoated staple fiber, the first layer and the second layer being bound together with the binder material; and
   a third layer having the binder fiber, wherein the second layer is sandwiched between the first layer and the third layer, the second layer and the third layer being bound together with the binder material,
   wherein the first layer, the second layer, and the third layer comprise a bound calendared construction.

2. The power transformer according to claim 1,
   wherein a respective property of the first layer and the second layer are selected to generate an unequal stress at an interface between the first layer and the second layer; and wherein an property of the second layer and the third layer are selected to generate an unequal stress at an interface between the second layer and the third layer.

3. The power transformer according to claim 1, wherein the first layer includes 30-80% (w/w) binder fibers and 70-20% (w/w) uncoated stable fibers.

4. The power transformer according to claim 1, wherein the second layer includes 0-5% (w/w) binder fibers and 100-95% (w/w) uncoated stable fibers.

5. The power transformer according to claim 1, wherein the staple fiber is a polyethylene terephthalate (PET).

6. The power transformer according to claim 1, wherein the binder material is a polybutylene terephthalate (PBT).

7. The power transformer according to claim 1, further comprising a cooling fluid, fluidly coupled to the first transformer component, the second transformer component and the electrical insulator, to cool the first transformer component and the second transformer component during operation.

8. The power transformer according to claim 1, wherein the staple fiber includes nanoclay particles.

9. The power transformer according to claim 1,
   wherein the first layer and the second layer includes 30-80% (w/w) binder fibers and 70-20% (w/w) uncoated stable fibers;
   wherein the second layer includes 0-5% (w/w) binder fibers and 100-95% (w/w) uncoated stable fibers;
   wherein the staple fiber is a polyethylene terephthalate (PET); and
   wherein the binder material is a polybutylene terephthalate (PBT).

10. The power transformer according to claim 8, wherein the nanoclay particles comprise montmorillonite having aluminosilicate layers surface-substituted with metal cations and stacked in multilayer stacks.

11. The power transformer according to claim 1, further comprising a cryogenic cooling fluid, fluidly coupled to the first transformer component, the second transformer component and the electrical insulator, to cool the first transformer component and the second transformer component during operation,
    wherein the power transformer comprises one of the following: a superconducting power transformer or is associated with a superconducting device.

12. The power transformer according to claim 1, wherein the electrical insulator comprises a density of about 0.50 grams/cubic centimeter (g/cc) to about 1.20 grams/cubic centimeter (g/cc).

13. The power transformer according to claim 1, wherein the binder fiber comprises the binder material extruded over the binder fiber.

14. The power transformer according to claim 1, wherein the binder fiber comprises a plurality of binder fibers having the binder material extruded over the plurality binder fibers.

15. The power transformer according to claim 1, wherein a portion of the binder fiber comprises the binder material extruded over the binder fiber and another portion of the binder fiber is uncoated.

16. A power transformer, comprising:
    a first transformer component;
    a second transformer component; and
    an electrical insulator disposed between the first transformer component and the second transformer component, the electrical insulator including:
    a first layer having a binder fiber, the binder fiber being a staple fiber coated with a binder material;
    a second layer having an uncoated staple fiber, the first layer and the second layer being bound together with the binder material; and
    a third layer having the binder fiber, wherein the second layer is sandwiched between the first layer and the third layer, the second layer and the third layer being bound together with the binder material, wherein the first layer, the second layer, and the third layer comprise a bound calendared construction wherein the first layer and the second layer includes 30-80% (w/w) binder fibers and 70-20% (w/w) uncoated stable fibers;

wherein the second layer includes 0-5% (w/w) binder fibers and 100-95% (w/w) uncoated stable fibers;

wherein the staple fiber is a polyethylene terephthalate (PET);

wherein the binder material is a polybutylene terephthalate (PBT); and wherein the binder fiber comprises the binder material extruded over the binder fiber.

17. The power transformer according to claim 16, wherein the electrical insulator comprises a density of about 0.50 grams/cubic centimeter (g/cc) to about 1.20 grams/cubic centimeter (g/cc).

18. The power transformer according to claim 16, wherein the staple fiber includes nanoclay particles.

19. The power transformer according to claim 16, wherein a respective property of the first layer and the second layer are selected to generate an unequal stress at an interface between the first layer and the second layer; and wherein an property of the second layer and the third layer are selected to generate an unequal stress at an interface between the second layer and the third layer.

20. The power transformer according to claim 18, wherein the nanoclay particles comprise montmorillonite having aluminosilicate layers surface-substituted with metal cations and stacked in multilayer stacks.

* * * * *